Figure 1:
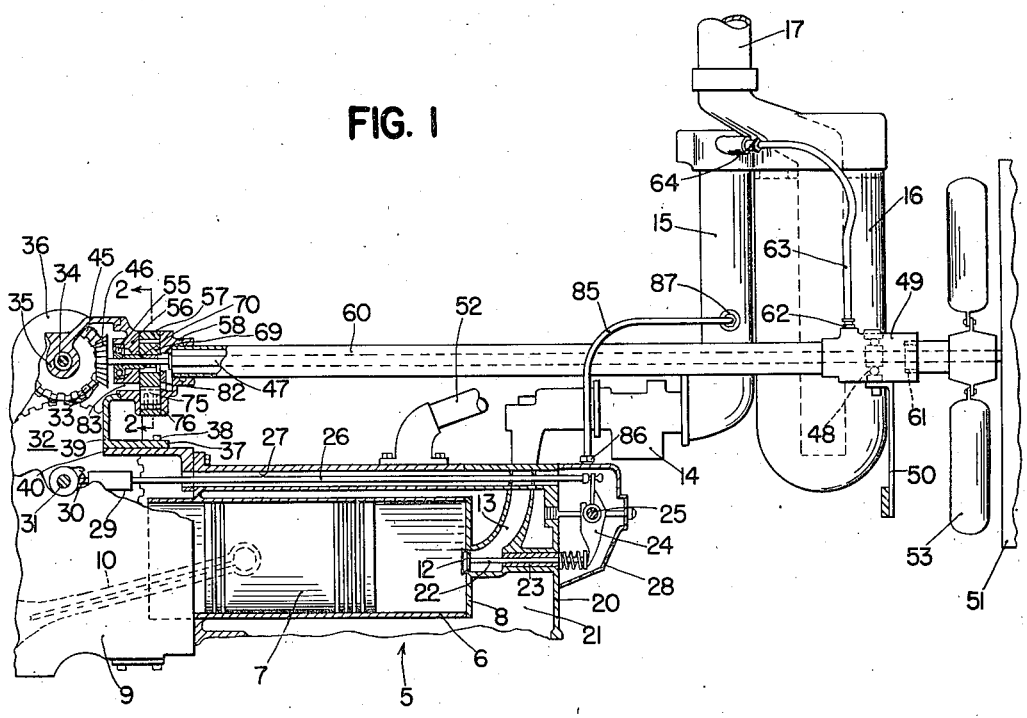

Nov. 5, 1946.  E. McCORMICK  2,410,514

CRANKCASE VENTILATING SYSTEM

Filed Oct. 14, 1944

*INVENTOR.*
ELMER McCORMICK

Patented Nov. 5, 1946

2,410,514

UNITED STATES PATENT OFFICE 2,410,514

CRANKCASE VENTILATING SYSTEM

Elmer McCormick, Waterloo, Iowa, assignor to John Deere Tractor Company, Waterloo, Iowa, a corporation of Iowa Application October 14, 1944, Serial No. 558,779

4 Claims. (Cl. 123—119)

The present invention relates generally to internal combustion engines and more particularly to means for ventilating the crank case of an internal combustion engine in order to reduce the adulteration and dilution of the lubricating oil in the crank case due to water vapor, gases and raw fuel which leak past the pistons into the crank case.

Internal combustion engines in fast moving vehicles are usually provided with crank case ventilating means which uses the natural movements of air due to the speed of the vehicle for circulating through the crank case and ventilating the same. In slow moving vehicles such as tractors, it has been the practice to provide a duct connecting the crank case to the intake air duct of the engine and employ the suction in the intake manifold for drawing the ventilating air through the crank case. In this type of system, a separate intake is provided at the opposite end of the crank case, with an intake air filter for cleaning the air as it is drawn into the crank case. The advantage of this type of ventilating system is that any oil fumes in the crank case, as well as vaporized fuel are burned in the engine and expelled with the engine exhaust and therefore do not condense to form a greasy film on the exterior of the engine as in the case where the air from the crank case is discharged through an aperture.

This system, however, has the disadvantage that the amount of air circulating through the crank case is dependent on the pressure differential between the intake air duct and the atmosphere, and this pressure differential is at a minimum when the engine is idling and therefore engines which run idle for extended periods are likely to be insufficiently ventilated.

Therefore, it is one of the principal objects of the present invention to provide a crank case ventilating system that operates positively and is substantially independent of the load which the engine is carrying.

A further object relates to the provision of a ventilating system in which the crank case is subjected to a pressure which is slightly above atmospheric pressure at all times. A conventional system using a negative pressure differential, bears the possibility of air being drawn into the crank case through any small cracks or openings that might exist, but which have no provision for filtering the air. It is important in certain types of engines, especially those on tractors, to protect the air entering the crank case from dust and grit, since the engine is usually operated in dusty conditions.

In the accomplishment of these objects, I have provided a simple rotary type pump which forces air into the crank case, thereby raising the pressure therein above atmospheric pressure, and in conjunction therewith I establish a duct connection between the crank case and the air intake duct, through which the ventilating air passes, carrying the oil fumes into the engine to be burned therein. The intake of the air pump, according to my invention, is connected to the main air cleaner, which filters the dust and grit out of the air used for combustion in the engine. This eliminates the necessity for a separate air cleaner for the crank case breather opening, while a positive flow of ventilating air is obtained.

One type of tractor known to those skilled in the art is provided with an engine having horizontally disposed fore and aft extending cylinders with the crank case at the rear end of the cylinders but with the air cleaner and intake manifold at the forward ends of the cylinders. In order to obtain power for driving the ventilating air pump, it is desirable to locate the latter at the rear end of the engine on the crank case, and therefore there is a problem of conducting the air from the air cleaner at the forward end of the engine to the pump at the rear end of the engine. Accordingly, another object of the present invention relates to the provision of novel means for conducting the air from the air cleaner to the ventilating pump. In the accomplishment of this object, I mount the pump on the fan shaft, which extends forwardly from the crank case through a long tubular enclosure to the cooling fan at the front end of the tractor. This long tubular enclosure provides a convenient duct through which the air can be drawn to the ventilating pump, and therefore I provide a short connecting duct between the air cleaner and the forward end of the fan shaft enclosure, while the rear end of the enclosure is connected to the intake passage of the pump.

These and other objects and advantages of my invention will be apparent to those skilled in the art after a consideration of the following description, in which reference is had to the drawing appended hereto, in which Figure 1 is a side elevational view showing an engine of the horizontal cylinder type equipped with a ventilating system embodying the principles of the present invention, portions of the mechanism being broken away to show the internal construction thereof.

Figure 2:
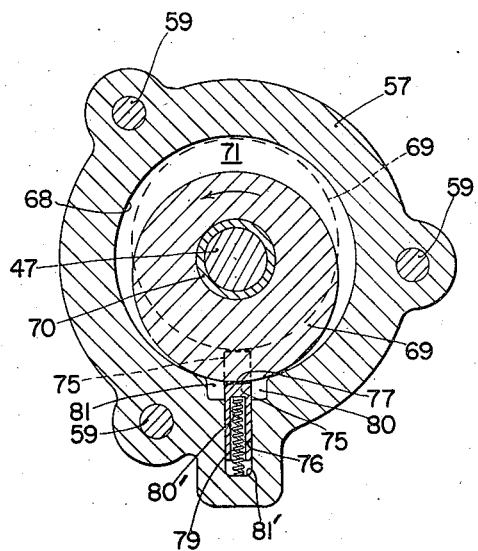

Figure 2 is an enlarged sectional elevational view taken along a line 2—2 in Figure 1 and showing the details of the pump construction.

Referring now to the drawing, the internal combustion engine 5 comprises a cylinder 6 within which is slidably disposed a piston 7. The piston and cylinder are disposed on a horizontal axis with the cylinder head 8 adjacent the forward end of the tractor (not shown), in which the engine is mounted, while the crank case 9 is disposed at the rear end of the cylinder 6. The piston 7 is connected to the crankshaft (not shown) by a conventional connecting rod 10. The cylinder 6 is provided with an intake valve 12 in the cylinder head 8 and also an exhaust valve (not shown). The intake valve 12 controls the flow of mixed air and fuel to the cylinder, through an intake manifold 13, which is connected to a carburetor 14 in a conventional manner. The carburetor 14 receives air through an intake duct 15, which receives clean air from the air cleaner 16, the latter having an intake pipe 17 extending vertically above the tractor to draw air from the atmosphere at a point above the tractor, as is well-known to those skilled in the art. The engine 5 is provided with a water jacket 20 which defines a water chamber 21 surrounding the cylinder 6 and the valve mechanism and manifold 13.

The valves 12 are of the poppet valve-in-head type and have valve operating stems 22 extending forwardly through a valve sleeve 23 into abutment with a rocker arm 24. The rocker arm 24 is mounted on a shaft 25. Each rocker arm 24 is actuated by a push rod 26, the several push rods extending horizontally through passages 27 in the upper portion of the cylinder casting. The rocker arms and operating mechanism are protected by an enclosure 28 over the forward end of the engine.

The push rods 26 extend rearwardly through the passages 27 into the crank case 9, where they are carried in supporting sleeves 29, the rear end of each push rod being engaged by a cam 30 on a camshaft 31. The camshaft 31 is driven by a gear 32 which is in meshing relation with a drive gear (not shown) on the crankshaft.

The camshaft gear 32 is also in mesh with a gear 33 on a governor shaft 34 journaled in bearings 35 within a governor housing 36. The housing 36 is provided with a supporting flange 37 which is secured by bolts 38 to the top surface of the crank case 9. The bottom of the housing 36 is provided with an opening 39 which is fixed in register with an opening 40 in the top of the crank case 9, through which the camshaft gear 32 extends.

Governor mechanism (not shown) is connected with the shaft 34 for controlling the speed of the engine in a manner well-known to those skilled in the art, and the shaft 34 also carries a bevel gear 45 which meshes with a bevel pinion 46 on the end of a drive shaft 47 which extends forwardly through the front wall of the housing 36 and extends over the top of the engine 5 to the forward end of the tractor, where it is journaled in a ball bearing 48 supported in a bearing sleeve 49 mounted on a bracket 50 fixed to the forward end of the tractor. A cooling radiator, indicated at 51, is provided at the forward end of the tractor for cooling the water for the water jacket of the engine and is connected to the latter by suitable upper and lower connections, the upper water jacket connection being indicated by reference numeral 52. Behind the radiator 51 is disposed a cooling fan 53 mounted on the forward end of the shaft 47 ahead of the supporting sleeve 49.

The rear end of the shaft 47 is carried in a ball bearing 55 mounted in an end shield 56 in the forward end of the housing 36.

A pump housing 57 is secured to the forward face of the end shield 56 and a hub member 58 is mounted on the forward face of the pump housing 57. The end shield 56, pump housing 57, and hub member 58, are rigidly secured together by a plurality of bolts 59 which clamp the three elements together. The hub member 58 is tubular in form and receives the rear end of a tubular enclosure 60, through which the fan shaft 47 extends. The forward end of the tubular enclosure 60 is fixed within the bearing sleeve 49 in substantially coaxial relation to the shaft 47. The forward end of the supporting sleeve 49 is provided with a sealing element 61 which seals off the forward end of the sleeve 49 and prevents air from getting into the enclosure 60. The rear portion of the supporting sleeve 49 is provided with a duct fitting 62, which connects one end of a short duct or tube 63 in communication with the interior of the sleeve 49 and tubular enclosure 60. The tube 63 extends upwardly and rearwardly and is connected by a suitable fitting 64 to the upper end of the air intake passage 15.

The pump housing 57 is provided with a cylindrical chamber 68, within which is rotatably disposed a pump rotor 69. The rotor 69 is cylindrical in form but is somewhat smaller in diameter than the internal diameter of the chamber 68, and the rotor 69 is mounted in eccentric relation on a sleeve 70 which is rigidly mounted on the drive shaft 47. The rotor 69 is mounted on the shaft 47 with its greatest radius equal to the radius of the chamber 68, so that the rotor 69 makes a sliding contact along one side of its periphery with the inner surface of the chamber 68. Thus, there is a crescent shaped space 71 left in the chamber 68 between the inner wall of the latter and the rotor 69, which rotates about the axis of the shaft 47 during operation. The rotor is shown in dotted lines in Figure 2 in a position rotated 180 degrees from the position shown in solid lines.

A vane or valve member 75 is disposed within a slot 76 in the pump housing 57 and has an inner bearing surface 77 which is disposed in sliding contact with the cylindrical outer surface of the rotor 69. The vane 75 is coextensive with the axial length of the rotor 69 and is maintained in sliding contact therewith by means of compression springs 79 which are seated within sockets 80' in the vane 75 and react against the bottom 81' of the slot 76. The inner end of the slot 76 is widened to form intake and discharge passages 80, 81 along opposite sides of the inner edge of the vane 75. The forward end of the intake passage 80 is disposed in communication with a radially extending passage 82 in the hub member 58, which communicates with the interior of the tubular shaft enclosure 60. The rear end of the discharge passage 81 is connected in communication with a rearwardly extending passage 83 in the end shield 56 of the housing 36.

Thus, it is evident that with each revolution of the rotor 69, the air within the crescent-shaped space 71 is forced by displacement of the rotor 69 through the discharge passage 81, the axially extending passage 83, into the interior of the housing 36, through the aligned openings 39, 40, into the crank case 9.

The air is thus pumped from the tubular enclosure 60 into the crank case 9, and since the air within the tubular enclosure 60 is obtained from the intake duct 15, it is clean air which has been filtered through the air filter 16. The tubular enclosure 60, which is standard equipment on tractors of this type, for the purpose of shielding and protecting the rotating fan shaft 47, thus also serves as an intake air duct extending from the air cleaner 16 at the forward end of the tractor to the pump at the rear end of the engine.

A return duct 85 is connected by a suitable fitting 86 to the housing 28 at the forward end of the engine, the other end of the duct 85 being connected by a suitable fitting 87 to the intake duct 15.

During operation, air is drawn by the suction of the pump through the fitting 64, the tube 63, into the sleeve 49, along the tubular enclosure 60 into the crescent-shaped pump chamber 71 through the passage 82 and the intake 80 of the pump. The rotation of the rotor 69 displaces the air within the space 71 through the passage 81 on the opposite side of the vane 75, through the passage 83 in the shield 56, through the housing 36 into the crank case 9. The air then flows forwardly through the passages 27 for the push rods 26, into the housing 28 at the forward end of the engine, returning to the intake duct 15 through the return tube 85. Any vaporized fuel or lubricating oil that is suspended in the air, is thus discharged into the air which is used for combustion in the engine, and by ventilating the crank case and rocker arm housing, these vapor fumes are removed before they have a chance to condense and cause dilution of the oil in the crank case.

Inasmuch as the engine drives the pump at substantially constant speed, the flow of ventilating air is substantially constant at all times during operation, and inasmuch as the crank case is maintained under a slight positive pressure above atmospheric pressure, there is no influx of dirt or grit into the crank case.

I claim:

1. In combination with an internal combustion engine having a substantially air-tight crank case, an air cleaner for cleaning air for combustion in said engine, and an air intake duct connecting said cleaner with said engine, an air pump driven by said engine and having an air intake passage connected with said air intake duct and having a discharge passage connected with said crank case for supplying clean air from said air cleaner to said crank case under pressure for ventilating purposes, and duct means connecting said crank case to said air intake passage for exhausting air and oil fumes from said crank case for use in combustion.

2. In an internal combustion engine having a substantially air-tight crank case, an air cleaner for cleaning air for combustion in said engine, an air intake duct connecting said cleaner with said engine, a cooling fan, a drive shaft therefor, drive means for said shaft, a housing for said drive means in communication with said crank case, and a tubular enclosure for said drive shaft, the combination of an air pump mounted on said drive housing and connected to receive air from said tubular enclosure, duct means connecting said enclosure with said intake duct for supplying clean air through said enclosure to said pump, means directing the discharged air from said pump into said crank case, and duct means connecting said crank case with said intake duct for discharging air and fumes from said crank case for use in said engine.

3. In an internal combustion engine having a substantially air-tight crank case, an air cleaner for cleaning air for combustion in said engine, an air intake duct connecting said cleaner with said engine, a cooling fan, a drive shaft therefor, drive means for said shaft, a housing for said drive means mounted on said crank case remote from said air cleaner and said fan and having its interior in communication with said crank case, and a tubular enclosure for said drive shaft, the combination of an air pump comprising a rotor mounted on said fan drive shaft and a housing mounted on said drive housing and having a discharge passage in communication with said drive housing and an intake passage in communication with said shaft enclosure, duct means connecting said shaft enclosure to said air cleaner to supply clean air through said enclosure to said pump, and duct means connecting said crank case with said intake duct for discharging air and fumes from said crank case for use in said engine.

4. In an internal combustion engine having a substantially air-tight case, an air cleaner at one end of said engine for cleaning air for combustion in said engine, an air intake duct connecting said cleaner with said engine, a cooling fan disposed near said air cleaner, a drive shaft therefor, said shaft extending along said engine, drive means for connecting said shaft to said engine adjacent the opposite end of the latter, a housing for said drive means mounted on said engine case and having its interior in communication with said case, and a tubular enclosure for said drive shaft, the combination of an air pump comprising a rotor mounted on said fan drive shaft and a housing mounted on said drive housing and having a discharge passage in communication with said drive housing and an intake passage in communication with said shaft enclosure, duct means at said one end of said engine connecting said shaft enclosure to said air cleaner to supply clean air through said enclosure to said pump, and duct means at said one end of said engine connecting said engine case with said intake duct for discharging air and fumes from said case for use in said engine.

ELMER McCORMICK.